United States Patent [19]

Eastcott et al.

[11] 3,734,257
[45] May 22, 1973

[54] METHOD AND APPARATUS FOR TORQUE SHARING

[75] Inventors: Peter De Hertel Eastcott; William Albert Messervey; William Albert Wyeth, all of Peterborough, Ontario, Canada

[73] Assignee: Canadian General Electric Company Limited, Toronto, Ontario, Canada

[22] Filed: June 14, 1971

[21] Appl. No.: 152,617

[30] Foreign Application Priority Data

Oct. 2, 1970 Canada..................................094619

[52] U.S. Cl. ................192/87.13, 74/661, 192/.02, 192/.098
[51] Int. Cl. ...............................................F16d 25/10
[58] Field of Search................192/.098, 48.7, 87.13, 192/.034, 87.14, .02

[56] References Cited

UNITED STATES PATENTS

| 3,173,526 | 3/1965 | Eakin | 192/87.14 |
| 2,838,913 | 6/1958 | Peterson et al. | 192/87.13 |
| 2,910,889 | 11/1959 | Lackey | 74/661 |
| 3,576,106 | 4/1971 | Nowiciki | 74/661 |

Primary Examiner—Benjamin W. Wyche
Attorney—John J. Kissane et al.

[57] ABSTRACT

A preferred embodiment of the invention has two like synchronous motors coupled to drive a common load, each motor through an air actuated friction clutch. In starting the drive, the motors are first brought up to synchronous speed unloaded, and the clutches are then engaged by applying pressurized air to them at a rate controlled to load the motors as equally as possible. Once the drive is in operation, the pressure of the air in both clutches is relieved simultaneously for a very short duration of time depending on the motor loads, the clutch for the more heavily loaded motor for the longer time and the clutch for the more lightly loaded motor for the shorter time. This allows both clutches to slip for short times in which the clutch for the more heavily loaded motor slips a little longer than the clutch for the more lightly loaded motor. As a result, load is transferred from the more heavily loaded motor to the more lightly loaded motor. If necessary, the pressure relieving cycle is repeated a number of times until the motors share the load.

11 Claims, 6 Drawing Figures

INVENTOR.
PETER deH. EASCOTT
WILLIAM A. MESSERVEY
WILLIAM A. WYETH

GENERAL CASE FOR PULSING TWO CLUTCHES IN WHICH (1) $\mu_{SA} > \mu_{SB}$ (2) $\mu_{DA} < \mu_{DB}$ (3) TORQUE DEMAND ON "A" > TORQUE DEMAND ON "B".

(4) PULSE TIME ON "A" > PULSE TIME ON "B".

*INVENTOR.*
PETER deH. EASCOTT
WILLIAM A. MESSERVEY
WILLIAM A. WYETH

METHOD AND APPARATUS FOR TORQUE SHARING

This invention relates to a drive system employing two or more torque transmitting devices such as clutches or brakes, and in particular to a means and method of manipulating the devices for purposes of load sharing.

When two or more clutches or brakes are used with a common load, they must share the load between them according to their design capabilities for optimum performance. In the case where two synchronous motors drive a common load, each motor through a clutch, it is important that the clutches be capable of adjustment so that the motors are made to share the load properly. Likewise, when two separate sets of brakes are used to brake a common load, it is important that the brakes be capable of adjustment so that they are made to share the braking load. Since the invention is considered to be particularly applicable to drives having two synchronous motors coupled to drive a common load through clutches, the discussion to follow will be directed specifically to such drives.

United States Pat. No. 3,369,636 issued Feb. 20, 1968 to J.E. Nelson, discloses a drive for an ore grinding mill wherein two like synchronous electric motors drive the mill, each motor through an air actuated friction clutch and a pinion meshing with a bull gear on the mill. This drive includes means for sensing the output of each motor and means for using the signals sensed for controlling the operation of the clutches. In operation, both motors are brought up to synchronous speed with their clutches disengaged, after which the clutches are actuated to start the mill. On a motor attaining a specified starting output, its sensing means assumes control over the air to its clutch. The air supply to the clutches is now controlled for clutch slippages directed toward equalizing motor loads, and once equal the clutches are fully engaged. Although this scheme provides a degree of load sharing, it is considered by many people skilled in this art to be not accurate enough for large low speed synchronous motors where the load angles are very small indeed. For example, a typical 60 cycle, 180 RPM, 6000 HP, synchronous motor may have a load angle measured at the clutch in the order of 1.4° or 84 minutes of arc for 100 percent load change on the motor. Therefore, sharing load between motors to 2 percent requires clutch settings to 1.68 minutes of arc.

The object of this invention is to improve load sharing between torque transmitting devices coupled to a common load.

A load sharing drive has a number of devices for transmitting torque by means of friction surfaces actuated by a fluid under pressure. Each device has means for indicating the share of the load it takes. According to the invention, the drive includes means for simultaneously relieving the fluid pressure in the devices for a very brief interval, allowing the friction surfaces to slip for a very short duration of time. The duration of pressure relief is longer for the more heavily loaded devices so that their friction surfaces slip longer than those of the more lightly loaded devices. This causes the more heavily loaded devices to reduce load and the more lightly loaded devices to increase load. It may be necessary to repeat the pressure relieving cycle a number of times before the load is properly shared between the devices.

In the preferred embodiment of the invention, two like synchronous motors are coupled to drive a common load, each through an air actuated friction clutch and each having a load indicator. For purposes of load sharing, the drive is provided with means for simultaneously relieving the air pressure on the clutches for a very brief interval, allowing the clutches to slip for a very short duration of time. The interval of pressure relief is a little longer on the heavier loaded motor than it is on the lighter loaded motor, so that the clutch on the former slips a little longer than the clutch on the latter. Briefly uncoupling the motors from the load in this way causes the motor uncoupled the shorter time to increase load and the motor uncoupled the longer time to decrease load. The pressure relieving cycle may be repeated a number of times to obtain proper load sharing between the motors.

Starting a drive of the preferred embodiment and making the motors share the load may be carried out as follows:

1. The motors are started and brought up to synchronous speed unloaded, i.e., clutches disengaged;
2. The clutches are then engaged at a controlled slip through regulation of the pressure of the air in them so as to load the motors for the best sharing possible;
3. The load on each motor is sensed, and the air pressure in the clutches is relieved simultaneously for very short time durations, the time duration being shorter for the more lightly loaded motor and longer for the more heavily loaded motor; and
4. If necessary, the pressure relieving cycle is repeated a number of times until the load sensors indicate proper sharing of the load between the motors.

A better understanding of the invention may be had from the following description of a preferred embodiment taken with the accompanying drawings, in which FIG. 1 is a diagram of a drive employing two synchronous motors coupled to a common load through air actuated clutches;

Figure 1:
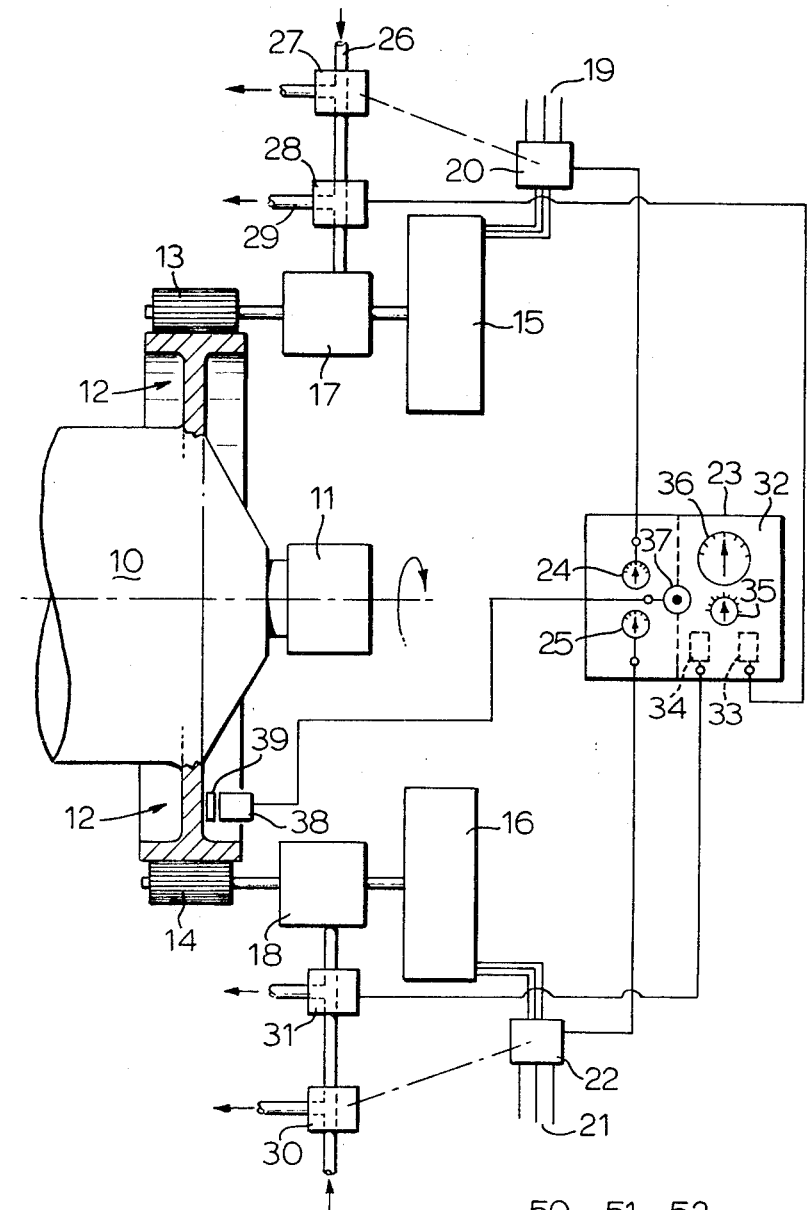

In FIG. 1, there is shown an ore grinding mill 10 supported for rotation on a horizontal axis by means of a pair of outboard bearings, one of which is shown at 11. The mill is driven by a bull gear 12 secured coaxially to the periphery of the mill at one end thereof. This gear meshes with and is driven by a pair of pinions 13 and 14 which in turn are driven by a pair of like synchronous motors 15 and 16 respectively, through air actuated friction clutches 17 and 18 respectively. The motors are mounted at the bull gear end of the mill in spaced relation with the axis of rotation of each motor, its clutch and pinion aligned and parallel to the axis of the mill. Mill 10 is, therefore, driven by the two motors, motor 15 through clutch 17 and motor 16 through clutch 18.

Motor 15 has its AC winding energized from a three phase AC source by way of line 19 and a load sensor 20 connected in the line, e.g., an ammeter or a wattmeter, and motor 16 has its AC winding energized from the same AC source by way of line 21 and a load sensor 22. The DC windings of the two motors are energized in the usual way. Sensors 20 and 22 are connected to indicators 24 and 25 respectively on an operator's control panel 23. Indicators 24 and 25 give readings of the input to motors 15 and 16 respectively, and since the output of each motor is directly related to its input, the indicators tell the operator the share of the mill load taken by each motor. The output of each motor may also be sensed directly and indicated at 24 and 25, e.g., by means of a torque sensor on the motor shaft.

Clutch 17 is connected to a source of compressed air by way of an air line 26, a control valve 27, and a two-way valve 28. Valve 28 is an electrically operated valve having a normally deenergized position which provides a direct air flow passage from valve 27 to clutch 17, and an energized position which shuts off the air from valve 27 and vents the clutch to the atmosphere via an exhaust outlet 29. This valve operates very fast in changing from one position to the other. Valve 27 controls the flow of air to the clutch for engagement thereof and releases the air from the clutch for disengagement thereof. This valve may be remotely controlled in response to certain starting or running conditions. Valves 27 and 28 are shown as separate units in the interest of simplicity in illustrating the invention. They may, of course, be combined in a single unit. Clutch 18 is connected to the source of compressed air through a pair of similar valves 30 and 31 which serve the same purpose in and elements 16, 18 and 14 as valves 27 nd 28 do in elements 15, 17 and 13.

A timer 32 on the operator's panel contains two timing elements 33 and 34 electrically connected to valves 28 and 31 respectively for control thereof. One timing element 33 energizes valve 28 on closing its contacts at the beginning of a timed interval and de-energizes the valve on opening its contacts at the end of the timed interval. The other timing element 34 controls valve 31 in the same way. Timer 32 may have a control knob 35 for setting a basic timing interval on both elements of equal duration, and another knob 36 for increasing any one interval over the basic interval. If, for example, knob 36 is turned clockwise from a neutral point, it increases the time interval on element 33 over the basic interval on element 34. Likewise, turning the knob anti-clockwise from its neutral point increases the time interval on element 34 over the basic interval now on element 33. Hence the durations of time that valves 28 and 31 are energized for purposes of exhausting the air from clutches 17 and 18 can be the same or different depending on the setting of knobs 35 and 36. A manually actuated switch 37 on the operator's panel is interconnected electrically with a mill actuated switch 38 in such a way that both must be actuated to complete a circuit. Switch 38 is stationary and may be magnetically actuated by means of a permanent magnet 39 secured to bull gear 12. Hence switch 38 is actuated once every revolution of the mill at a specific point in the revoluation. These switches are used to initiate the timing intervals. To do so switch 37 is actuated manually and the next time that switch 38 comes under the influence of magnet 39 it too is actuated to complete the circuit and simultaneously start elements 33 and 34 timing. Both intervals begin at the same time but end at slightly different times. It is also possible to have both intervals begin at different times and end at the same time, or even have them begin and end at different times. The important thing is that the interval for the more heavily loaded motor be longer than the interval for the more lightly loaded motor.

The operation of the drive will now be considered. The motors are started and brought up to synchronous speed unloaded, i.e., the clutches disengaged. Once they are at synchronous speed, valves 27 and 30 are opened at a controlled rate to admit compressed air to the clutches. The incoming air engages the friction surfaces of the clutches at a controlled rate so that the clutches transmit torque at an increasing rate and finally lock the surfaces together. Engaging the clutches is carried out as rapidly as it is possible to load the motors because long durations of clutch slippage tend to overheat the clutches and degrade them.

Although the clutches are engaged at a rate controlled to provide the best load sharing possible between the motors, the settings will seldom, if ever, be good enough for continuous mill operation. Therefore, adjustments are made according to the invention as follows:

1. The operator looks at indicators 24 and 25 and observes the imbalance of loads between the motors.
2. He then sets knob 35 to the basic time interval. This will be the interval that the air pressure will be relieved in the clutch for the lighter loaded motor.
3. Next, he sets knob 36 to the additional time that the pressure will be relieved in the clutch for the heavier loaded motor. This interval will be the basic plus the additional set by knob 36.
4. He then actuates switch 37 and waits for the mill to actuate switch 38 to begin the pressure relieving cycle.
5. After the pressure relieving cycle has been completed, he observes the indicators again for load imbalance and if not properly balanced, he repeats steps (2) to (4).

Whenever switches 37 and 38 are actuated to energize the timing circuit, simultaneous signals from timing elements 33 and 34 energize valves 28 and 31 respectively and cause them to operate very fast, shutting off the air supply to the clutches and venting the clutches to the atmosphere. When each time interval ends, the valve operates equally fast to restore full air pressure to the clutch. During the time of pressure relief, the clutches can slip, the one on the heavier loaded motor slipping for a little longer time than the one on the lighter loaded motor because it was timed for longer pressure relief. The motor with the longer time of clutch slip will, therefore, lose load and the one with the shorter time of clutch slip will pick-up load, thereby improving the load distribution between the motors. The times that the clutches are permitted to slip will be very short indeed, in the order of a fraction of a second. Clutch slippage occurs at very low relative velocities of the friction surfaces, so little heat is generated. The purpose of switch 38 is to make the load adjustments take place at the same point in the revolution of the mill, thereby avoiding errors, e.g., errors due to gear runout, which might otherwise appear in the adjustment.

Although the means and method for making the motors share the load have been described as a manual operation, it is to be understood that the operation readily lends itself to automatic control as well. Therefore, automatic as well as manual control is intended.

Figure 2:
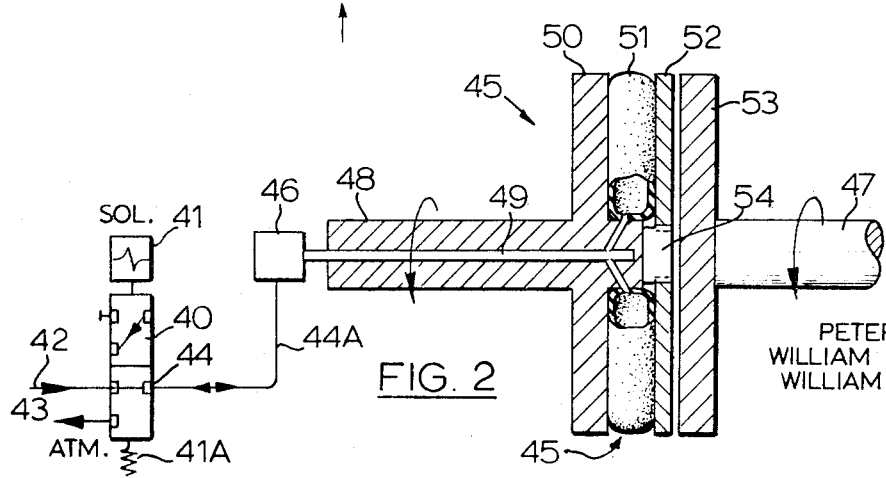
FIG. 2 is a diagram in section of a clutch and its control valves.

A practical embodiment of the system shown in FIG. 1 will now be described in more detail with reference to FIGS. 2 to 6. The principal components of the system are shown in FIG. 2 and consist of a two-stage high-speed industrial air valve 40, a rotating air seal 46, and a pneumatically actuated clutch 45 for connecting driving shaft 48 to driven shaft 47. Clutch 45 consists of a disc 50 secured to shaft 48, a disc 53 secured to shaft 47, an axially movable friction disc 52 and an annular inflatable elastomeric tube 51. When the tube is inflated with compressed air, it reacts against disc 50 to drive friction plate 52 against disc 53. Disc 52 is keyed or splined at 54 to rotate as a unit with driving shaft 48 but free to move axially under the thrust of tube 51. Disc 53 is mechanically secured to driven shaft 47 and has neither axial nor rotational freedom with respect to shaft 47. Frictional lining material is secured to the surface of disc 52 adjacent disc 53, and this material is therefore pressed against the inner face of disc 53 with a unit pressure directly proportional to the instantaneous air pressure in tube 51. If the coefficient of friction of the frictional material that comes into contact with the surface of disc 53 is designated as $u$, then, $$T = k \cdot u_S \cdot P \tag{I}$$

$$T = k \cdot u_D \cdot P \tag{II}$$

where:

$T$ = the torque being transmitted between shaft 48 and driven shaft 47, $k$ = constant of proportionality for the clutch and units of measurement used, $u_S$ = friction lining coefficient of friction when no slip is occurring, $u_D$ = dynamic coefficient of friction when slipping is taking place, and $P$ = the air pressure in tube 51 forcing disc 52 against disc 53.

Poppet valve 40 is shown with the solenoid pilot valve 41 de-energized, and held positively in this position by spring 41A which opposes the pilot valve. Compressed air is admitted from air line 42 to port 44 of valve 40, and communicates through a short flexible tube 44A to a rotating air seal 46 carried by shaft 48. Shaft 48 is drilled axially to provide air passage 49 which communicates with the inside of tube 51. Therefore, as shown in FIG. 2, air line 42 is able to inflate tube 51 and maintain a continuous pressure therein to hold the clutch in the engaged position, coupling shafts 48 and 47 together. When the electric winding of pilot valve 41 is energized, valve port 44 is exhausted to atmosphere through port 43 while the incoming line air pressure at port 42 is closed off. If valve 41 controlling poppet valve 40 is energized for a short interval, the variation of pressure with time in tube 51 will be as shown in FIG. 3, wherein the instantaneous pressure, P, in tube 51 is shown vertically against a horizontal time scale.

Figure 3:
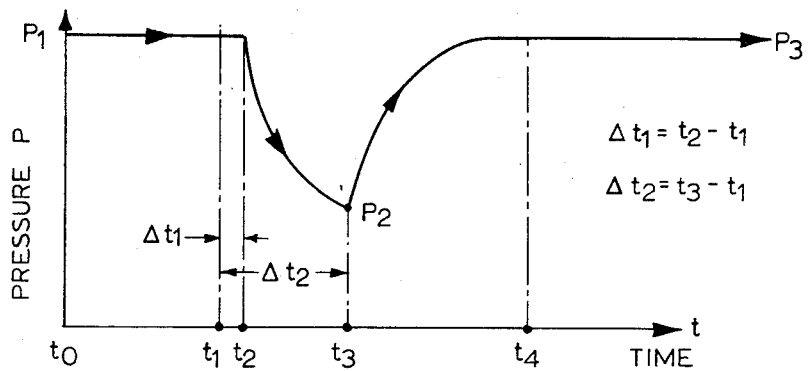
FIG. 3 to 6 are charts illustrating certain operating features of the drive shown in FIG. 2.

Referring to FIG. 3, from $t_0$ to $t_1$ valve 41 is de-energized as shown in FIG. 2, and tube 51 is inflated to the same pressure as air line 42. At time $t_1$ solenoid pilot valve 41 is energized, and after a very short time delay, $\Delta t_1$, shifts poppet valve 40 to exhaust tube 51 to atmosphere. Since shaft air passages 49, rotating seal 46, line 44A, and the internal air passages of valve 40 offer some frictional resistance to flow, the pressure in tube 51 will decrease as a function of time somewhat as shown in FIG. 3 between $t_2$ and $t_3$. If the electrical signal reached valve 41 at $t_1$, then the response time of composite valve 40-41 is $\Delta t_1 = t_2 - t_1$. Similarly, if the electrical signal is interrupted a valve-delay time equal to $\Delta t_2$ before $t_3$, the pressure in tube 51 will drop to $P_2$ at time $t_3$ and then rise again to equal line pressure $P_3$ = $P_1$, the general shape of the time-pressure curve being as shown due to the frictional effects caused by the air passages. In practice, if $P_1$ equals 100 psi, and $P_2$ equals 50 psi, the interval $t_4 - t_2$ during which the pressure in tube 51 is below the pressure in line 42 may be as short as 0.2 seconds. The value $P_2$, to which the pressure and torque transmitting ability of the clutch falls, depends entirely upon how long line 44A is vented to atmosphere through port 43, and this is in turn proportional to the duration of the electrical signal which causes pilot valve 41 to operate.

If the electric signals to valve 41 are made successively shorter in duration, an infinite family of curves will result. For an electrical impulse shorter than $\Delta t_1$, $P_2$ will be equal to $P_1$ and $P_3$, or no reduction in the pressure within tube 51 will occur. Conversely, if the electric signal is of sufficient duration, then $P_2$ will equal atmospheric pressure, or the clutch tube 51 will be completely vented to the atmosphere. Hence, the pressure ratio $P_2/P_1$ is clearly a function of the interval during which valve 41 is energized; the ratio will be 1.0 for electrical signals shorter than $\Delta t_1$, and 0 for electrical signals longer than the exhaust time of the clutch, line 49, seal 46, line 44A, and valve 40. These components comprise an isolated pneumatic system discharging to atmosphere through valve port 43. Since the torque transmission capability of the clutch is a function of pressure, $P$, as shown by equations I and II, it follows that a transient in clutch tube pressure as shown in FIG. 3 will cause a corresponding transient in torque transmission capability which may cause the clutch to slip if the latter falls below the torque demand of the driven shaft 47.

Figure 4:
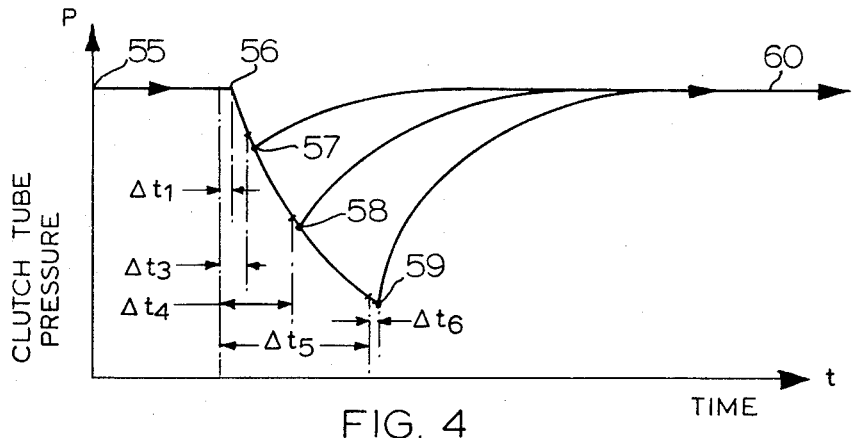

Referring to FIG. 4, instantaneous clutch pressure, $P$, is plotted vertically against time, $t$, on the horizontal or x-axis for three different operating times of valve 41. Again, the valve delay on opening is shown as $\Delta t_1$; the valve delay on closing is shown as $\Delta t_6$. The sole effect of $\Delta t_1$ and $\Delta t_6$ on the system is that the response of pressure is slightly behind the electrical signal controlling it. For an electrical impulse of duration $\Delta t_3$, clutch pressure will follow the locus 55, 56, 57 to 60; similarly $\Delta t_4$ will cause P to follow the locus 55, 56, 57, 58 to 60; and finally $\Delta t_5$ will produce the locus 55, 56, 57, 58, 59 to 60. Hence, it is apparent that the decrease in clutch pressure in response to a short electrical impulse on valve 41 is a function of the pulse length. If the pulse is shorter than $\Delta t_1$, no drop in pressure will occur; if the pulse is sufficiently long, $P$, the clutch tube pressure will drop to atmospheric pressure and the clutch will completely release. It also follows from equations I and II that there is a discrete level of torque corresponding to pressure minima 57, 58, and 59 beyond which the friction lining on disc 52 will commence slipping over the surface of driven disc 53.

Figure 5:
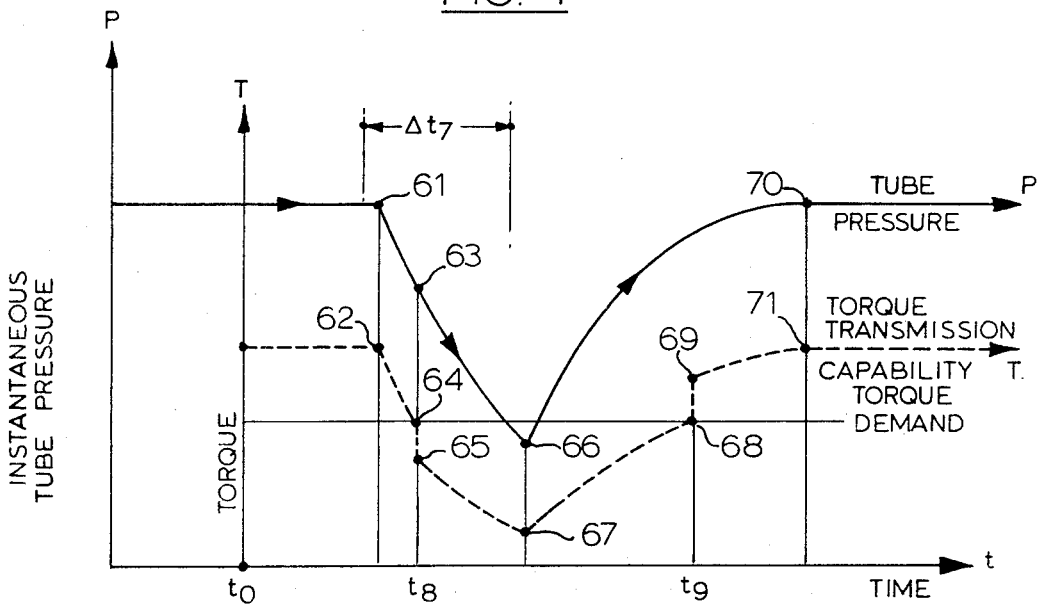

FIG. 5 shows the time locus of tube 51 pressure, $P$, and the resulting torque, $T$, transmission capability of the clutch as a function of time in response to an electrical signal on valve 41 of duration $\Delta t_7$. The pressure follows locus 61, 63, 66, 70. The corresponding torque transmission capability of the clutch follows locus 62, 64, 65, 67, 68, 69, 71. From 62 to 64 the clutch is locked up until the torque demand line is intersected, and formula I applies. From 64 to 65 slip commences, and formula II applies since in the general case $u_S$ is larger than $u_D$. This shows that clutch torque transmission capability is a direct function of the pressure in tube 51 until slip commences at point 64, at which instant, torque $T$, drops in zero time to value 65. Clearly, the region 64, 65 is a bistable phenomenon which constitutes a discontinuity in the torque function, or a partial loss of control of $T$ as a function of P. The converse is true on increasing pressure, and this is shown by the vertical rise of $T$ in zero time from point 68 to 69. The discontinuous regions 64, 65 and 68, 69 are entirely due to the static coefficient of friction $u_S$ being larger than the dynamic coefficient of friction, $u_D$, for the clutch lining used. Practically, $u_S$ may be from 5 to 60 percent larger than $u_D$.

It is also evident from FIG. 5 that the clutch is slipping from time $t_8$ to time $t_9$, and therefore with a given set of parameters such as torque demand, inertia on either side of the clutch, values of $u_S$ and $u_D$; etc., the angle through which the clutch slips, $\theta$, will be a function of slip - time area 64, 65, 67, 68. The larger this area, the greater will angle $\theta$ become, and it was shown in FIG. 4 that the slip - time area is a function of electric signal duration, $\Delta t$. Therefore, a clutch may be slipped through discrete angles $\theta$ by applying an electric signal of the corresponding duration to valve 41. Generally speaking, the longer the signal $\Delta t$, the larger the resulting total slip angle $\theta$ which results.

The principle by which this control system achieves precise angular control of the load angles of two or more synchronous motors driving a common mill ring gear through pneumatic clutches will now be apparent. If each clutch is controlled by its own valve and the valves are fed equal electrical time pulses, then it is apparent that the clutches may be made to inch through equal angles $\theta$ since they will have equal slip - time areas 64, 65, 67, 68. Hence, following an impulse causing each clutch to slip by an angle $\theta$, the relative load angles of the synchronous driving motors will remain unchanged, regardless of the absolute magnitude of $\theta$. However, if a particular motor is carrying more than its share of the load (load angle too large), it may be made to shed load by making the electrical pulse signal to its valve slightly longer than the pulse to the valve of the partner clutch.

From the above description of operation, the following will be apparent to those skilled in the art of pneumatic clutch use and control:

a. Following an electrical impulse to valve 41 the resulting angle $\theta$ through which the clutch slips is proportional to slip-time area 64, 65, 67 and 68 shown on FIG. 5.

b. The slip-time area and resulting angle $\theta$ is a function of both pulse length, $\Delta t$, and clutch torque demand at the moment inching occurs. Generally, the further point 67 penetrates below the clutch torque demand line, the larger will $\theta$ become as shown on FIG. 5. If point 67 just penetrated the torque demand line (say at position 65) then a very minute angle $\theta$ will result.

c. By pulsing both clutches simultaneously, the differential angle $\Delta\theta$ representing the load angle correction depends only on the difference of the several slip-time areas for the clutches so inched. Hence, with relatively crude valves and time pulse control, $\Delta\theta$ may be made a very small percentage of the actual clutch slip angles, $\theta_1, \theta_2 \ldots \theta_n$. For example, with a $\Delta t$ interval capable of inching each clutch through not less than $\theta$ equal to 10 percent motor load angle, it is quite easy to make $\Delta\theta$ 1/10th of $\theta$ or 1 percent. Hence, relatively gross steps of 10 percent result in a net load adjustment of 1 percent.

d. By making successive steps in the differential mode it is possible to increase or decrease the load angle of a particular motor at will. Not only is individual clutch pulsing relatively crude, but it can only result in a decrease of load angle.

e. Those skilled in control or regulator art will also appreciate another very desirable feature in using the differential method herein described to make small net load angle changes in a system that is inherently stable; i.e., a system which tries to move in a direction to attain perfect load sharing. The motor carrying the greatest load when synchronizing is attempted will have the largest load angle and its torque demand line on FIG. 5 will lie above that for its partner clutch. With equal pulses and all other parameters equal, the most heavily loaded clutch will intersect the torque demand line first and commence slipping first. Consequently, the time-slip area 64, 65, 67, 68 and slip angle $\theta$ will automatically be greatest for the most heavily loaded machine.

f. Similarly, small differences or variations in the valves, valve springs, air piping, and $u_S$ and $u_D$ for each clutch may be zeroed out by an appropriate setting of knob 36 shown in FIG. 1. It is to be expected that the balance point setting of this control will vary from hour to hour and day to day, particularly due to changes in the various coefficients of friction involved. However, since the net correction angle per valve operation is very small, the operator will have no trouble in finding the correct setting for knob 36 before the process gets into trouble by inadvertently advancing the more heavily loaded motor to assume even more load.

g. Pinion shaft windup for full load is usually in the order of 10 percent of motor load angle on a typical mill. While this fact alone may limit the minimum load angle step for each clutch to an angle from 3 to 5 electrical degrees, once again the difference can be held to closer than 1 percent per step.

h. Actual tests with valves, air passages and the worn shoe volumes of the largest clutches in use today have confirmed that the time interval $t_9 - t_8$ on FIG. 5 can be held to 0.05 seconds of time, and differential times in the order of 0.005 seconds are quite possible.

Since during this minute interval of time, the inertias on either side of the clutch are only accelerated by about 10 percent of full load torque (due to only partial clutch release), the differential angle $\Delta\theta$ tends to become infinitely small and a very high order of control accuracy is possible.

Figure 6:
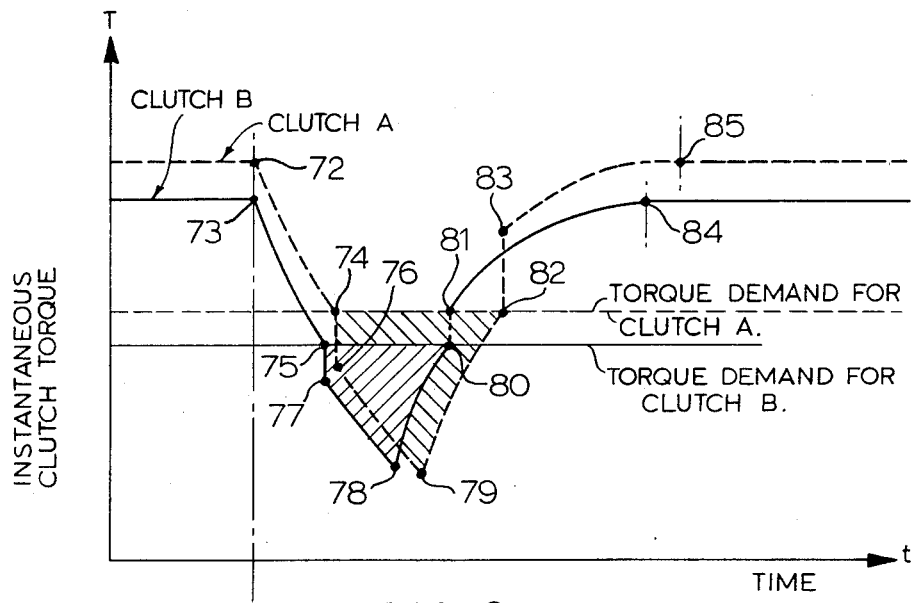

The General Case for two clutches coupling two synchronous motors to a common gear in which it is assumed that all parameters are unbalanced is shown in FIG. 6. This figure illustrates a general case where two clutches A and B are inched toward load sharing through pulsations in the air supply to the clutches. In this case the following conditions apply:

1. The coefficient of friction $u_S$ at no clutch slip is greater for clutch A than it is for clutch B.

2. The coefficient of friction $u_D$ during clutch slip is less for clutch A than it is for clutch B.

3. The torque demand on clutch A is greater than the torque demand on clutch B.

4. The pulse time on clutch A is longer than the pulse time on clutch B. In this case, the interval of pressure relief for both clutches begins at the same time 72, 73 and ends at different times 84 and 85, clutch A having the longer interval. Therefore, the motor for clutch A reduces its share of the total load and this reduction is taken by the motor for clutch B. This is demonstrated in FIG. 6 by the time slip area 74, 76, 79 and 82 for clutch A being greater than the time slip area 75, 77, 78 and 80 for clutch B. Stated in more general terms, the more heavily loaded motor shifts load to the more lightly loaded motor due to a slightly longer pulse time on the clutch of the former.

The discussion with reference to the drawings has been directed to clutches in a plural motor drive. Those skilled in the art will readily appreciate that the same scheme and mode of operation can also be applied to a braking system wherein two or more brakes must be made to share a common braking load.

The embodiments of the invention in which an exclusive property or privilege is claimed are defined as follows:

1. In a drive comprising a load; at least two torque transmitting devices, each device having engaging and disengaging friction surfaces actuated by a pressurized fluid for engagement of the surfaces and adapted to transmit torque when so engaged; a torque carrying element for each one of said devices; means connecting said first friction surfaces in all said devices to said load for operation therewith; other means connecting each one of said second friction surfaces to a different one of said elements for operation therewith; means for applying said pressurized fluid to said devices for engaging the friction surfaces therein; the method of sharing load between said devices comprising A. simultaneously relieving the fluid pressure in each one of said devices for short intervals of time, said intervals being shorter for the more lightly loaded devices than for the more heavily loaded devices; and B. repeating step (A) until the loads are shared properly between the devices.

2. The invention defined in claim 1 wherein said intervals of fluid pressure relief begin at the same time and end at different times.

3. The invention defined in claim 1 wherein said intervals of fluid pressure relief begin at different times.

4. A drive having two electric synchronous motors coupled to drive a common load, each motor through an air actuated friction clutch; means for applying compressed air to said clutches for engagement thereof and releasing the air for disengagement thereof; and means for adjusting the load between the two motors for making them share the load properly, said load adjusting means comprising means for measuring the respective loads on said motors; means for relieving the air pressure in both clutches at the same time for short intervals of time; said pressure relieving means for each clutch being a fast acting two-way valve, in one position said valve connecting the clutch to a source of compressed air and in the other position said valve disconnecting the source of compressed air and venting the clutch to the atmosphere and means for making the time interval for the more heavily loaded motor longer than the interval for the more lightly loaded motor, said intervals of pressure relief permitting low relative velocity slip of the clutches wherein the clutch for the more heavily loaded motor slips longer than the clutch for the more lightly loaded motor, causing a small shift in load from the more heavily loaded motor to the more lightly loaded motor.

5. The drive defined in claim 4 wherein said valves are electrically operated valves and the means for setting said time intervals is a timing device which controls the operation of the valves, said timing device having an adjustable timing range for each valve.

6. The drive defined in claim 5 wherein said timing device is adapted to begin said time intervals at the same time.

7. The drive defined in claim 5 wherein said timing device is adapted to begin said time intervals at different time.

8. In a drive having two electric synchronous motors driving a common load, each motor through a friction clutch engaged by means of compressed air, the method of making the motors share the load comprising A. measuring the loads on the motors;

B. relieving the air pressure in the clutches at the same time for short intervals of time, the interval being longer for the more heavily load motor than for the more lightly loaded motor;

C. repeating step (B) until step (A) indicates proper load sharing between the motors.

9. The method of claim 8 wherein the pressure relieving intervals begin at the same time.

10. The method of claim 8 wherein the pressure relieving intervals begin at different times.

11. The method of claim 8 wherein the pressure relieving intervals have a time duration of less than one second.

* * * * *